United States Patent
Tsukamoto et al.

(10) Patent No.: US 8,596,041 B2
(45) Date of Patent: Dec. 3, 2013

(54) CONTROL DEVICE AND CONTROL METHOD FOR VEHICLE

(75) Inventors: Norihiro Tsukamoto, Toyota (JP); Atsushi Ayabe, Toyota (JP); Tomohiro Asami, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 65 days.

(21) Appl. No.: 13/257,844

(22) PCT Filed: Apr. 2, 2009

(86) PCT No.: PCT/JP2009/056864
§ 371 (c)(1),
(2), (4) Date: Sep. 20, 2011

(87) PCT Pub. No.: WO2010/113307
PCT Pub. Date: Oct. 7, 2010

(65) Prior Publication Data
US 2012/0060479 A1    Mar. 15, 2012

(51) Int. Cl.
*F01N 3/00*    (2006.01)
(52) U.S. Cl.
USPC ............ 60/285; 60/273; 60/286; 60/290
(58) Field of Classification Search
USPC .................................. 60/274–324
See application file for complete search history.

(56) References Cited

U.S. PATENT DOCUMENTS

| 5,496,228 | A | * | 3/1996 | Takata et al. .......... 477/107 |
| 6,389,807 | B1 | * | 5/2002 | Suzuki et al. .......... 60/285 |
| 6,560,960 | B2 | * | 5/2003 | Nishimura et al. ...... 60/284 |
| 7,395,808 | B2 | * | 7/2008 | Yoshioka .............. 123/325 |
| 2002/0038543 | A1 | | 4/2002 | Nishimura et al. |
| 2005/0262827 | A1 | * | 12/2005 | Ichimoto et al. ........ 60/277 |
| 2008/0066718 | A1 | * | 3/2008 | Sato et al. ............ 123/350 |

FOREIGN PATENT DOCUMENTS

| DE | 601 21 267 T2 | 6/2007 |
| JP | A-8-128340 | 5/1996 |
| JP | A-9-42020 | 2/1997 |
| JP | A-9-217642 | 8/1997 |
| JP | A-2001-152942 | 6/2001 |
| JP | A-2004-132185 | 4/2004 |
| JP | A-2004-308542 | 11/2004 |
| JP | A-2006-249979 | 9/2006 |
| JP | A-2007-56712 | 3/2007 |

OTHER PUBLICATIONS

International Search Report issued in International Application No. PCT/JP2009/056864 on Apr. 28, 2009 (with translation).

\* cited by examiner

*Primary Examiner* — Kenneth Bomberg
*Assistant Examiner* — Jesse Bogue
(74) *Attorney, Agent, or Firm* — Oliff & Berridge, PLC

(57) ABSTRACT

An ECU executes the program including the step acquiring a catalyst temperature when the execution condition for fuel-cut control is satisfied; the step selecting a throttle opening degree based on the catalyst temperature; the step executing fuel-cut control; and the step executing return control from fuel-cut control when the condition for returning from fuel-cut control is satisfied.

8 Claims, 7 Drawing Sheets

CONTROL DEVICE AND CONTROL METHOD FOR VEHICLE

TECHNICAL FIELD

The present invention relates to control of a vehicle equipped with an internal combustion engine, and particularly to control of the opening degree of a throttle valve in accordance with the catalyst temperature during execution of fuel-cut control.

BACKGROUND ART

There is a conventionally known technique for limiting the intake air amount during execution of fuel-cut control so as to prevent the catalyst from being brought into a high temperature state and into a lean state.

For example, Japanese Patent Laying-Open No. 2001-152942 (PTL 1) discloses a control device for an internal combustion engine which maximizes the utilization of high stability control by fuel-cut control while minimizing a decrease in comfort during driving, but still can prevent thermal deterioration and melting damage resulting from an excessive temperature rise of the catalyst for exhaust air purification. This control device for the internal combustion engine is characterized in that a catalyst for exhaust air purification is provided in the exhaust path of the internal combustion engine mounted in the vehicle, and the control device for the internal combustion engine limiting the engine speed of the internal combustion engine or the vehicle speed to a prescribed value or less includes catalyst temperature detecting means for detecting or estimating the catalyst temperature of the catalyst for exhaust air purification, and controlling means for imposing a limitation by fuel-cut control in the case where the catalyst temperature detected by the catalyst temperature detecting means is equal to or lower than a prescribed temperature, and for imposing a limitation by controlling the intake air amount in the case where the catalyst temperature is higher than the prescribed temperature.

The control device for the internal combustion engine disclosed in the above-described Patent Literature provides an advantage that, when limiting the engine speed of the internal combustion engine or the vehicle speed to an upper limit value or lower, the control device maximizes the utilization of high stability control by fuel-cut control while minimizing a decrease in comfort during driving, but still can prevent thermal deterioration and melting damage resulting from an excessive temperature rise of the catalyst for exhaust air purification.

CITATION LIST

Patent Literature

PTL 1: Japanese Patent Laying-Open No. 2001-152942

SUMMARY OF INVENTION

Technical Problem

However, in the case where the throttle valve is closed to limit the intake air amount during execution of fuel-cut control, there is a problem that the responsiveness to increase the output power of the engine is deteriorated at the time of return from fuel-cut control.

This is because the opening degree of the throttle valve closed when the condition for returning from fuel-cut control is satisfied is controlled to be increased to the normal opening degree of the throttle valve, which causes a delay in the output power increase in the engine.

The above-described problems are not taken into consideration in the above-mentioned Patent Literature, and therefore, cannot be solved.

An aim of the present invention is to provide a control device and a control method for a vehicle which allow the output power of the engine to be increased with excellent responsiveness at the time of return from fuel-cut control.

Solution to Problem

The control device for a vehicle according to an aspect of the present invention provides a control device for a vehicle equipped with an internal combustion engine. The internal combustion engine includes a cylinder, an intake path for introducing air into the cylinder, a flow rate regulating valve for regulating a flow rate of the air introduced through the intake path into the cylinder, a fuel supply device for supplying a fuel to the internal combustion engine, an exhaust path for circulating exhaust gas discharged from the cylinder, and a catalyst provided in a middle of the exhaust path and purifying the exhaust gas. The control device includes an acquisition unit acquiring a temperature of the catalyst by performing one of detection and estimation of the temperature of the catalyst; a determination unit determining whether a predetermined condition for starting fuel-cut control to stop supply of the fuel by the fuel supply device is satisfied or not; a fuel-cut control unit executing fuel-cut control when the predetermined condition is satisfied; and an opening degree control unit controlling an opening degree of the flow rate regulating valve during execution of fuel-cut control by the fuel-cut control unit such that the flow rate of the air supplied from the intake path to the cylinder is equal to the flow rate corresponding to the temperature of the catalyst acquired by the acquisition unit.

According to the present invention, when the opening degree of the flow rate regulating valve (for example, a throttle valve) is controlled to achieve the flow rate corresponding to the acquired temperature of the catalyst, fuel-cut control can be executed without closing the throttle valve to the opening degree at which the throttle valve is fully closed. Accordingly, when the condition for returning from fuel-cut control is satisfied, the throttle valve can be immediately opened to the normal opening degree of the throttle valve, so that the delay in the output power increase in the engine can be mitigated. Consequently, deterioration of the catalyst can be suppressed while the responsiveness at the time of return can also be improved. Therefore, a control device and a control method for a vehicle can be provided which allow an increase in the output power of the engine with excellent responsiveness at the time of return from fuel-cut control.

Preferably, the flow rate regulating valve is a throttle valve. The control device further includes a calculation unit calculating an opening degree of the throttle valve based on the temperature of the catalyst acquired by the acquisition unit. The calculation unit calculates the opening degree of the throttle valve corresponding to the temperature of the catalyst such that the opening degree of the throttle valve calculated when the temperature of the catalyst acquired by the acquisition unit is a first temperature is greater than the opening degree of the throttle valve calculated when the temperature of the catalyst is a second temperature higher than the first temperature. The opening degree control unit controls the opening degree of the throttle valve so as to be equal to the opening degree calculated by the calculation unit during execution of fuel-cut control by the fuel-cut control unit.

According to the present invention, by controlling the calculated opening degree of the throttle valve so as to be equal to the opening degree corresponding to the acquired temperature of the catalyst, fuel-cut control can be executed without closing the throttle valve to the opening degree at which the throttle valve is fully closed. Accordingly, when the condition for returning from fuel-cut control is satisfied, the throttle valve can be immediately opened to reach the normal opening degree of the throttle valve, so that the delay in the output power increase in the engine can be mitigated. Consequently, deterioration of the catalyst can be suppressed while the responsiveness at the time of return can also be improved.

Further preferably, the control device further includes an engine speed detection unit detecting an engine speed of the internal combustion engine. The calculation unit calculates the opening degree of the throttle valve based on the engine speed of the internal combustion engine in addition to the temperature of the catalyst acquired by the acquisition unit.

According to the present invention, when the opening degree of the throttle valve is calculated based on the engine speed of the internal combustion engine in addition to the temperature of the catalyst, it becomes possible to suppress the deterioration of the catalyst while improving the responsiveness at the time of return in accordance with the operation state of the engine.

Further preferably, the control device further includes a deterioration detection unit detecting a deterioration state of the catalyst. The opening degree control unit controls the opening degree of the flow rate regulating valve during execution of fuel-cut control by the fuel-cut control unit such that the opening degree of the flow rate regulating valve is equal to the opening degree at which deterioration of the catalyst is suppressed when the deterioration state of the catalyst detected by the deterioration detection unit does not allow execution of control of the opening degree of the flow rate regulating valve corresponding to the temperature of the catalyst.

According to the present invention, in the case where the deterioration state of the catalyst does not allow execution of control of the opening degree of the flow rate regulating valve corresponding to the temperature of the catalyst, the opening degree of the flow rate regulating valve is controlled to be equal to the opening degree at which deterioration of the catalyst is suppressed. Consequently, it becomes possible to suppress deterioration of the catalyst while improving the responsiveness at the time of return in accordance with the deterioration state of the catalyst.

Further preferably, the vehicle is provided with an automatic transmission coupled to an output shaft of the internal combustion engine and transmitting motive power to a driving wheel. A plurality of drive components are provided on a power transmission path between the internal combustion engine and the driving wheel, The predetermined condition corresponds to at least one of a condition that a request for torque down aiming at protecting the drive components is issued to the internal combustion engine and a condition that upshift of the automatic transmission is started.

According to the present invention, when the throttle valve is controlled to achieve the opening degree corresponding to the temperature of the catalyst during execution of fuel-cut control by the request from the automatic transmission, deterioration of the catalyst can be suppressed while the responsiveness at the time of return can also be improved.

Advantageous Effects of Invention

According to the present invention, when the flow rate regulating valve (for example, a throttle valve) is controlled to achieve the flow rate corresponding to the acquired temperature of the catalyst, fuel-cut control can be executed without closing the throttle valve to the opening degree at which the throttle valve is fully closed. Accordingly, when the condition for returning from fuel-cut control is satisfied, the throttle valve can be immediately opened to reach the normal opening degree of the throttle valve, so that the delay in the output power increase in the engine can be mitigated. Consequently, deterioration of the catalyst can be suppressed while the responsiveness at the time of return can also be improved. Therefore, a control device and a control method for a vehicle can be provided which allow an increase in the output power of the engine with excellent responsiveness at the time of return from fuel-cut control.

DESCRIPTION OF EMBODIMENTS

Figure 1:
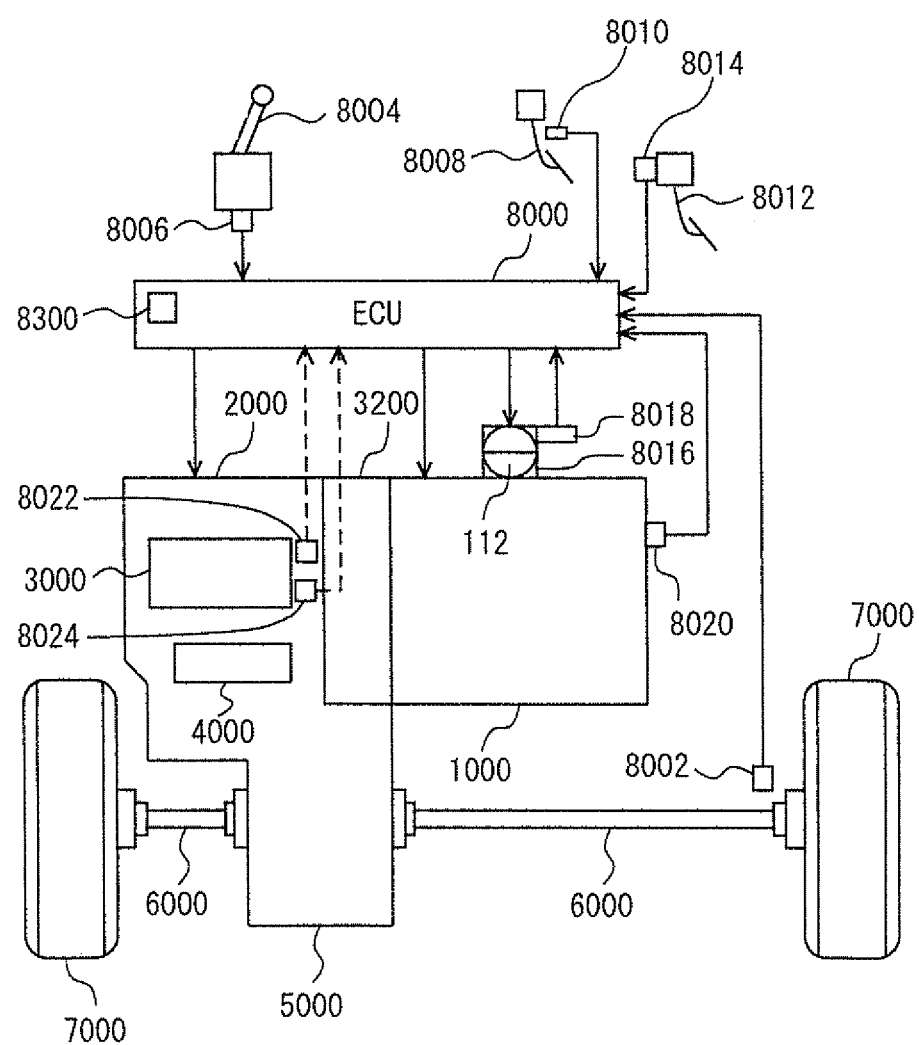
FIG. 1 is a schematic configuration diagram showing a powertrain controlled by a control device for a vehicle according to the present embodiment.

The embodiments of the present invention will be hereinafter described with reference to the drawings, in which the same components are designated by the same reference characters, and have the same names and functions. Therefore, detailed description thereof will not be repeated.

Referring to FIG. 1, the vehicle provided with a control device according to the embodiment of the present invention will be hereinafter described. This vehicle is an FF (Front engine Front drive) vehicle. It is to be noted that this vehicle may be a vehicle other than this FF.

The vehicle includes an engine 1000, an automatic transmission 2000, a planetary gear unit 3000 which is a component of automatic transmissions 2000, a hydraulic circuit 4000 which is a component of automatic transmissions 2000. a differential gear 5000, a drive shaft 6000, a wheel 7000, and an ECU (Electronic Control Unit) 8000. The control device of the automatic transmission according to the present invention is implemented by ECU 8000. ECU 8000 includes a memory 8300.

Engine 1000 is an internal combustion engine which serves to cause combustion of the gaseous mixture of the fuel and air injected from the injector (not shown) within the combustion chamber of the cylinder. This combustion causes the piston within the cylinder to be pressed down to thereby rotate the crankshaft.

Automatic transmission 2000 is coupled to engine 1000 through a torque converter 3200. Automatic transmission 2000 automatically provides a shift stage in accordance with the driving state of the vehicle. Automatic transmission 2000 changes the rotation speed of the crankshaft in accordance with the predetermined gear ratio corresponding to the provided shift stage. It is to be noted that automatic transmission 2000 may be a gear-type automatic transmission or may be a continuously variable automatic transmission continuously changing the gear ratio.

The output gear of automatic transmission 2000 engages with differential gear 5000. Drive shaft 6000 is coupled to differential gear 5000 by spline fitting or the like. Motive power is transmitted through drive shaft 6000 to wheel 7000 as a driving wheel on each of the right and left sides.

Components connected to ECU 8000 through a harness and the like include a wheel speed sensor 8002, a position switch 8006 of a shift lever 8004, an accelerator pedal position sensor 8010 of an accelerator pedal 8008, a stroke sensor 8014 of a brake pedal 8012, a throttle position sensor 8018 of an electronic throttle 8016, an engine speed sensor 8020, an input shaft rotation speed sensor 8022, and an output shaft rotation speed sensor 8024.

Wheel speed sensor 8002 detects the rotation speed of wheel 7000 and transmits the signal showing the detection results to ECU 8000. ECU 8000 calculates the velocity of the vehicle based on the received rotation speed of wheel 7000.

The position of shift lever 8004 is detected by position switch 8006, and the signal showing the detection results is transmitted to ECU 8000. The shift stage of automatic transmission 2000 is automatically provided in accordance with the position of shift lever 8004. Furthermore, it may be configured such that the manual shift mode allowing the driver to select an optional shift stage can be selected in response to the driver's operation.

Accelerator pedal position sensor 8010 detects the stepping amount of accelerator pedal 8008, and transmits the signal showing the detection results to ECU 8000. Stroke sensor 8014 detects the stepping amount of brake pedal 8012, and transmits the signal showing the detection results to ECU 8000.

Throttle position sensor 8018 detects the opening degree of the throttle valve of electronic throttle 8016 (hereinafter also referred to as a throttle opening degree) for which the opening degree is regulated by an actuator. Then, throttle position sensor 8018 transmits the signal showing the detection results to ECU 8000. The amount of air taken into engine 1000 (the output power of engine 1000) is regulated by electronic throttle 8016.

Engine speed sensor 8020 detects the rotation speed of the output shaft (crankshaft) of engine 1000 and transmits the signal showing the detection results to ECU 8000. Input shaft rotation speed sensor 8022 detects an input shaft rotation speed (hereinafter also referred to as a turbine rotation speed) NT of automatic transmission 2000, and transmits the signal showing the detection results to ECU 8000. Output shaft rotation speed sensor 8024 detects an output shaft rotation speed NO of automatic transmission 2000, and transmits the signal showing the detection results to ECU 8000. Since the output shaft of engine 1000 is connected to the input shaft of torque converter 3200 while the output shaft of torque converter 3200 is connected to the input shaft of automatic transmission 2000, the rotation speed of the output shaft of engine 1000 is rendered equal to the rotation speed of the input shaft of torque converter 3200. Furthermore, the input shaft rotation speed of automatic transmission 2000 is equal to the rotation speed of the output shaft of torque converter 3200.

ECU 8000 controls devices so as to bring the vehicle into the desired driving state based on the signals transmitted from wheel speed sensor 8002, position switch 8006, accelerator pedal position sensor 8010, stroke sensor 8014, throttle position sensor 8018, engine speed sensor 8020, input shaft rotation speed sensor 8022, output shaft rotation speed sensor 8024, and the like, and on the map and program stored in memory 8300 including an ROM (Read Only Memory) and the like.

In the present embodiment, ECU 8000 controls automatic transmission 2000 such that one shift stage of the first to sixth stages is provided when shift lever 8004 is in the D (drive) position to thereby select a D (drive) range for the shift range of automatic transmission 2000. When one shift stage of the first to sixth shift stages is provided, automatic transmission 2000 can transmit the driving force to wheel 7000.

When shift lever 8004 is in the N (neutral) position to thereby select an N (neutral) range for the shift range of automatic transmission 2000, automatic transmission 2000 is controlled to bring about the neutral state (power transmission interrupted state).

Figure 2:
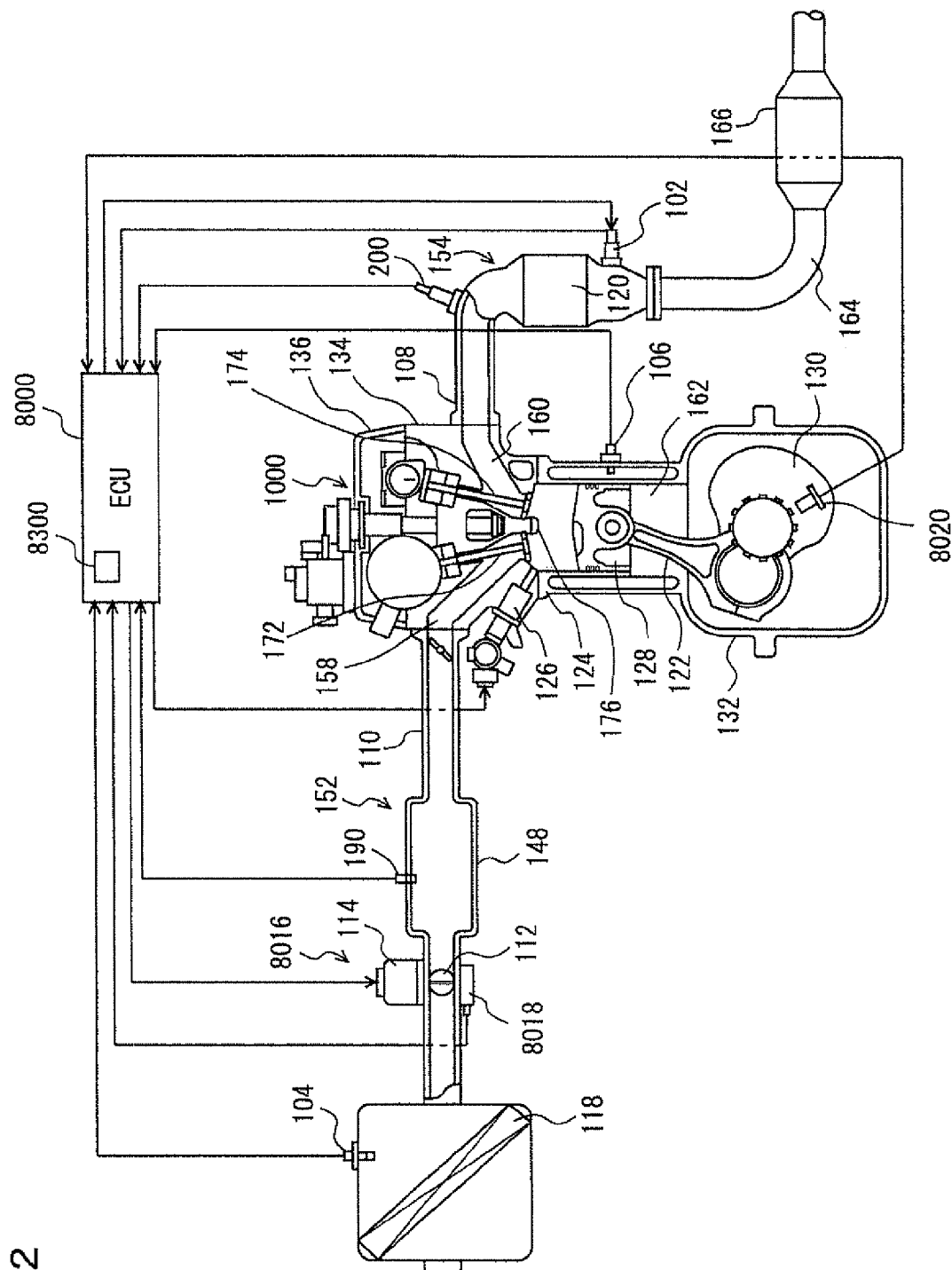
FIG. 2 is a diagram showing the configuration of the engine mounted in the vehicle.

As shown in FIG. 2, engine 1000 is provided with an intake system 152 and an exhaust system 154.

Engine 1000 includes a cylinder block 124, cylinders 162 formed in cylinder block 124 by a predetermined number for this cylinder block 124, a piston 128 slidably provided within cylinder 162, a piston rod 122 having one end connected to piston 128, a crankshaft 130 connected to the other end of piston rod 122, a crankcase 132 rotatably supporting crankshaft 130, an engine speed sensor 8020 detecting the engine speed of engine 1000 (hereinafter referred to as an engine speed), an intake port 158 for introducing the air circulated from intake system 152 into cylinder 162, an intake valve 172 provided in the connection between intake port 158 and cylinder 162, a fuel supply device 126 supplying a fuel to engine 1000, an exhaust port 160 for circulating the exhaust gas discharged from cylinder 162 to exhaust system 154, an exhaust valve 174 provided in the connection between exhaust port 160 and cylinder 162, and a spark plug 176 provided at the top of cylinder 162.

Crankshaft 130 is connected through a crank mechanism to the other end of piston rod 122 connected to piston 128 of each cylinder. The force exerted by combustion within each cylinder onto piston 128 is converted by the crank mechanism into the force in the rotation direction of crankshaft 130.

Intake valve 172 is operated in conjunction with the rotation of crankshaft 130, to allow connection and disconnection between intake port 158 and cylinder 162. Exhaust valve 174 is operated in conjunction with the rotation of crankshaft 130, to allow connection and disconnection between exhaust port 160 and cylinder 162.

A water temperature sensor 106 detects the temperature of the cooling water circulating through engine 1000 (hereinafter referred to as a cooling water temperature Tw). Water temperature sensor 106 transmits the signal showing the detected cooling water temperature Tw to ECU 8000.

Fuel supply device 126 directly injects fuel into cylinder 162 based on the control signal received from ECU 8000. It is to be noted that engine 1000 may be an engine provided with a fuel supply device which directly injects fuel into the cylinder or may be an engine provided with a fuel supply device which injects fuel into the intake path (port injection).

Alternatively, engine 1000 may be, for example, an engine equipped with a port injector which injects fuel into intake port 158, in addition to fuel supply device 126 which directly injects the fuel into cylinder 162. Furthermore, engine 1000 only needs to be operated by the fuel containing at least one of gasoline and alcohol.

Furthermore, ECU 8000 executes fuel-cut control when the predetermined execution conditions for fuel-cut control concerning the driving state of the vehicle are satisfied. In other words, ECU 8000 controls fuel supply device 126 to stop fuel supply when the execution conditions for fuel-cut control are satisfied.

The execution conditions for fuel-cut control include the condition that a vehicle is under deceleration and the engine speed of engine 1000 is equal to or greater than the predetermined engine speed. Furthermore, the execution conditions for fuel-cut control may further include the condition concerning the vehicle velocity and the condition concerning the cooling water temperature.

In the present embodiment, in addition to the above-described conditions, the execution conditions for fuel-cut control also include the condition that there is a request from the control system of automatic transmission 2000.

Specifically, the execution conditions for fuel-cut control include at least one of the condition that automatic transmission 2000 issues, to engine 1000, a request for torque down aiming at protecting the drive components and the condition that upshift is started in automatic transmission 2000. When fuel-cut control is executed at the time when torque down is requested or upshift is started, the engine speed of engine 1000 can be immediately reduced, which allows protection of the drive components or reduction in the time required for shifting gears.

The drive components are parts provided on the power transmission path between engine 1000 and wheel 7000, and include drive shaft 6000, differential gear 5000, a propeller shaft or the like, in addition to automatic transmission 2000.

Furthermore, in the case where the conditions for returning from fuel-cut control are satisfied after execution of the fuel-cut control, ECU 8000 returns from fuel-cut control and resumes supply of the fuel by fuel supply device 126. The return condition is that the above-described execution conditions for fuel-cut control are not satisfied.

Intake system 152 includes an intake pipe 110 connected to intake port 158, an air cleaner 118 provided in the middle of intake pipe 110, a throttle valve 112 provided in the middle of intake pipe 110 and located between air cleaner 118 and intake port 158, a throttle motor 114 operating throttle valve 112, throttle position sensor 8018 detecting the opening degree of throttle valve 112, an intake air temperature sensor 104 provided in the middle of intake pipe 110 and located between air cleaner 118 and throttle valve 112, a surge tank 148 provided in the middle of intake pipe 110 and located between throttle valve 112 and intake port 158, and an air flow meter 190 detecting an intake air amount. Intake port 158 and intake pipe 110 constitute an "intake path".

Furthermore, intake air temperature sensor 104 detects the intake air temperature. Intake air temperature sensor 104 transmits the signal showing the detected intake-air temperature to ECU 8000. Air flow meter 190 detects an intake air amount. Air flow meter 190 transmits the signal showing the detected intake air amount to ECU 8000. It is to be noted that ECU 8000 may estimate the intake air amount based on the signal received from the vacuum sensor which detects the degree of the negative pressure within intake pipe 110.

Exhaust system 154 includes a first exhaust pipe 108 connected to exhaust port 160, a three-way catalyst 120 provided in'the middle of first exhaust pipe 108, an air-fuel ratio sensor 200 provided in the middle of first exhaust pipe 108 and located closer to exhaust port 160 than three-way catalyst 120, a second exhaust pipe 164 coupled to first exhaust pipe 108, an oxygen sensor 102 provided in the middle of first exhaust pipe 108 and located closer to second exhaust pipe 164 than three-way catalyst 120, and a three-way catalyst 166 provided in the middle of second exhaust pipe 164. Exhaust port 160, first exhaust pipe 108 and second exhaust pipe 164 constitute an "exhaust path".

Air-fuel ratio sensor 200 detects the oxygen concentration in the exhaust gas closer to exhaust port 160 than three-way catalyst 120. Air-fuel ratio sensor 200 transmits the signal showing the detected oxygen concentration in the exhaust gas to ECU 8000. Specifically, air-fuel ratio sensor 200 outputs, to ECU 8000, the output voltage signal which varies linearly with respect to the oxygen concentration. ECU 8000 calculates the air-fuel ratio based on the output voltage signal received from air-fuel ratio sensor 200.

Oxygen sensor 102 detects the oxygen concentration in the exhaust gas closer to second exhaust pipe 164 than three-way catalyst 120. Oxygen sensor 102 transmits the signal showing the detected oxygen concentration in the exhaust gas to ECU 8000. Specifically, oxygen sensor 102 outputs, to ECU 8000, an output voltage signal which significantly changes the degree of the output voltage before and after the point of the theoretical air-fuel ratio with respect to the oxygen concentration. ECU 8000 determines based on the output voltage signal received from oxygen sensor 102 whether the air-fuel ratio is on the rich side or on the lean side with respect to the theoretical air-fuel ratio. It is to be noted that an air-fuel ratio sensor may be used in place of oxygen sensor 102.

When engine 1000 is operated, air is taken into intake pipe 110. The air taken into intake pipe 110 circulates through air cleaner 118 toward intake port 158. The flow rate of the air circulating through intake port 158 is limited in accordance with the opening degree of throttle valve 112.

The air circulated from intake port 158 into cylinder 162 is mixed with the fuel injected from fuel supply device 126. Upon closing intake valve 172 and exhaust valve 174, the air-fuel mixture of a fuel and air burns by spark plug 176 igniting the air-fuel mixture before and after piston 128 reaches the top dead center. When combustion occurs, piston 128 is pressed down by the combustion pressure toward the bottom dead center. The linear movement of piston 128 between the top dead center and the bottom dead center is converted by the crank mechanism into the rotation movement of crankshaft 130, which produces motive power in engine 1000.

The exhaust gas produced by combustion of the air-fuel mixture within cylinder 162 circulates from exhaust port 160 to first exhaust pipe 108 and flows into three-way catalyst 120. The nitrogen oxides (NOx) contained in the incoming exhaust gas are reduced in three-way catalyst 120. Furthermore, HC or CO contained in the incoming exhaust gas is oxidized in three-way catalyst 120. In the present embodiment, although three-way catalyst 120 is described as a catalyst used for reduction of NOx and oxidation of HC and CO, three-way catalyst 120 may purify other exhaust substances by reduction or oxidation.

In the vehicle having the above-described configuration, during execution of fuel-cut control, throttle valve 112 is controlled to be closed, which prevents the intake air from being flowing into the exhaust path without combustion, so that three-way catalyst 120 can be prevented from being brought into a high temperature state and into a lean state.

However, the above-described control may decrease the responsiveness to increase the output power of engine 1000 at the time of return from fuel-cut control.

This is because a delay occurs in the output power increase in engine 1000 since the opening degree of throttle valve 112 that is closed when the conditions for returning from fuel-cut control are satisfied is controlled to be increased to the normal opening degree of throttle valve 112.

Accordingly, the present embodiment is characterized in that, during execution of fuel-cut control, ECU 8000 not only controls the opening degree of throttle valve 112 such that the flow rate of the air supplied from intake pipe 110 into cylinder 162 is equal to the flow rate corresponding to the temperature of three-way catalyst 120, but also executes fuel-cut control.

Although the present embodiment is described to have a configuration in which the opening degree of throttle valve 112 is changed using a throttle motor to regulate the flow rate supplied from intake pipe 110 into cylinder 162, the configuration is not particularly limited thereto. For example, the lift amount of the intake valve may be changed using an actuator and the like to regulate the flow rate supplied from intake pipe 110 into cylinder 162.

Figure 3:
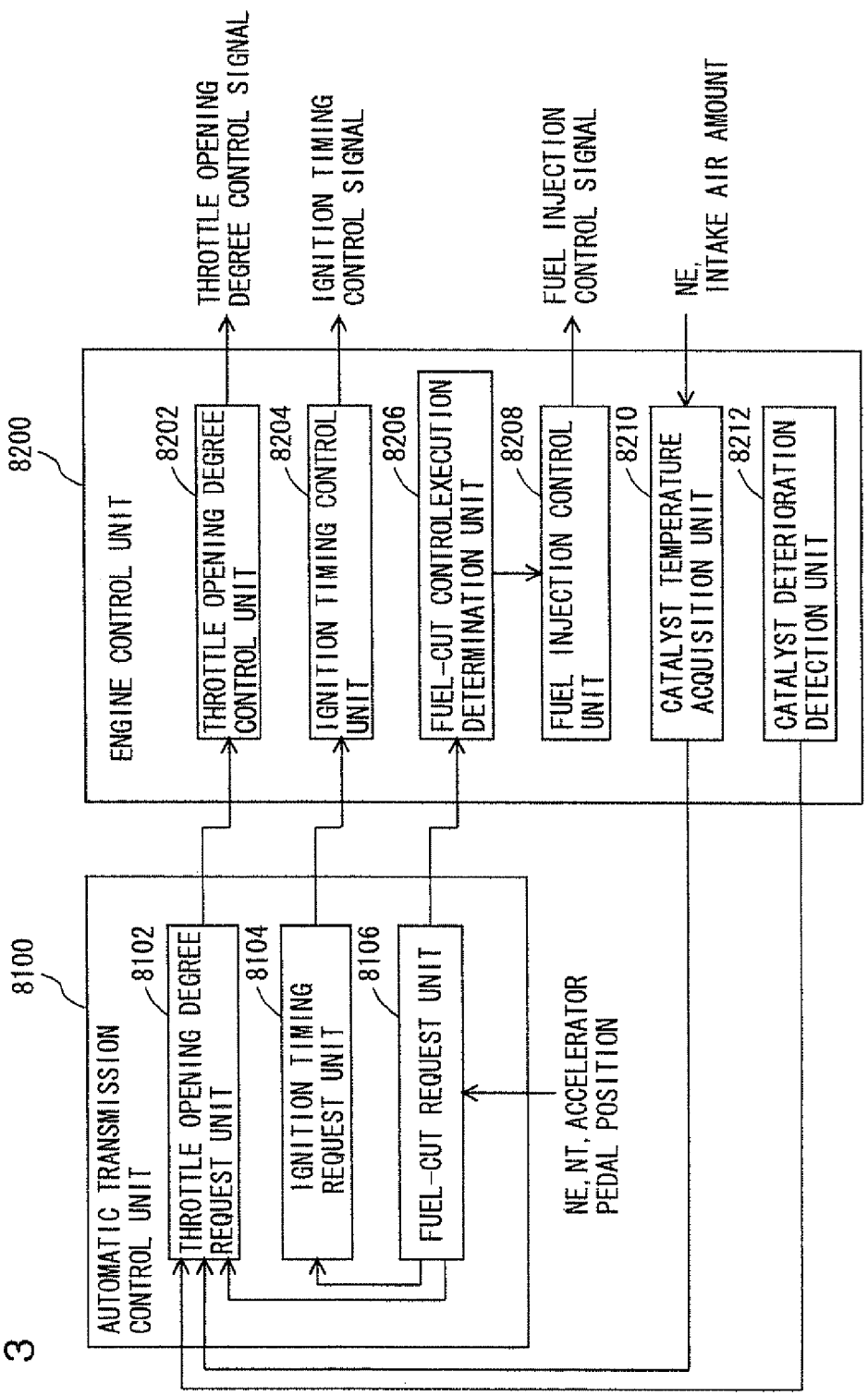
FIG. 3 is a functional block diagram (first) of an ECU which is a control device for the vehicle according to the present embodiment.

FIG. 3 shows a functional block diagram of ECU 8000 which is a control device for a vehicle according to the present embodiment. ECU 8000 includes an automatic transmission control unit 8100 and an engine control unit 8200.

Automatic transmission control unit 8100 includes a throttle opening degree request unit 8102, an ignition timing request unit 8104 and a fuel-cut request unit 8106.

Throttle opening degree request unit 8102 calculates the requested amount of the opening degree of throttle valve 112, in which case this request is issued by automatic transmission 2000 to engine 1000. Throttle opening degree request unit 8102 then transmits the calculated requested amount of the opening degree of throttle valve 112 to engine control unit 8200.

Throttle opening degree request unit 8102 calculates the requested amount of the opening degree of throttle valve 112 in accordance with the shift condition of automatic transmission 2000. Furthermore, in the case where fuel-cut request unit 8106 requests execution of fuel-cut control, throttle opening degree request unit 8102 calculates the opening degree of throttle valve 112 based on the temperature of three-way catalyst 120 acquired by a catalyst temperature acquisition unit 8210 described below and also on the map shown in FIG. 4.

Figure 4:
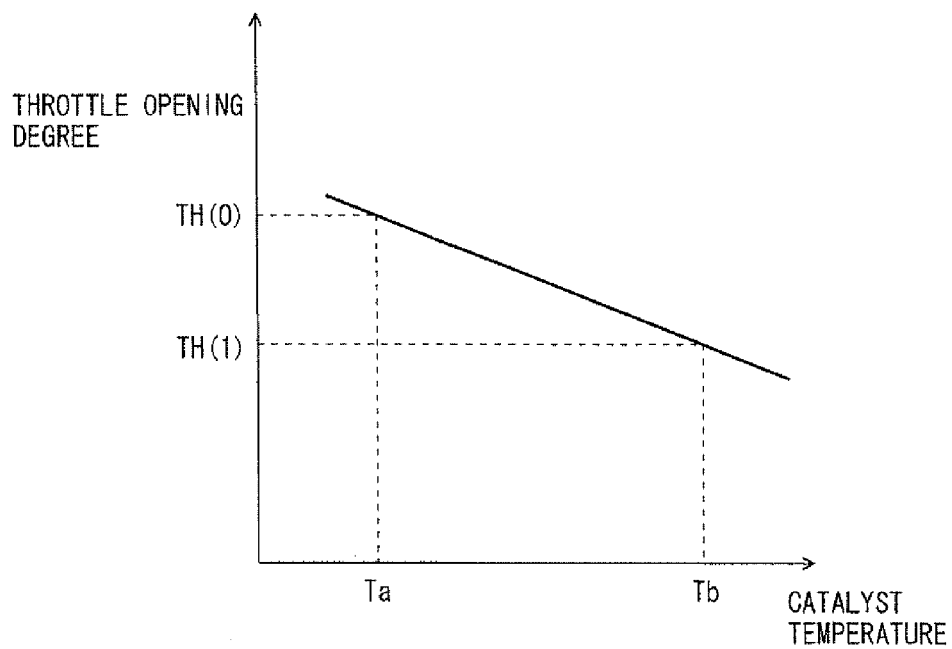
FIG. 4 is a diagram showing the throttle opening degree corresponding to the catalyst temperature.

For example, throttle opening degree request unit 8102 calculates an opening degree TH(0) based on the map shown in FIG. 4 in the case where fuel-cut request unit 8106 requests engine 1000 to execute fuel-cut control and the case where the temperature of three-way catalyst 120 acquired by catalyst temperature acquisition unit 8210 is a temperature Ta.

In addition, throttle opening degree request unit 8102 calculates an opening degree TH(1) smaller than an opening degree TH(0) based on the map shown in FIG. 4 in the case where the temperature of three-way catalyst 120 acquired by catalyst temperature acquisition unit 8210 is a temperature Tb higher than temperature Ta.

It is to be noted that the vertical axis in the map shown in FIG. 4 shows the opening degree of throttle valve 112 corresponding to the temperature of three-way catalyst 120 while the horizontal axis shows the temperature of three-way catalyst 120. The map shown in FIG. 4 is set in advance such that opening degree TH(0) of throttle valve 112 set in the case where the temperature of three-way catalyst 120 is equal to temperature Ta is greater than opening degree TH(1) of throttle valve 112 set in the case where the temperature of three-way catalyst 120 is equal to temperature Tb higher than temperature Ta. Then, the map is stored in memory 8300. In the map shown in FIG. 4, although there is a linear relationship between the temperature of three-way catalyst 120 and the opening degree of throttle valve 112, this relationship is not particularly limited to a linear relationship, but there may be a nonlinear relationship therebetween.

Furthermore, throttle opening degree request unit 8102 may calculate the opening degree of throttle valve 112 based on an engine speed NE in addition to the temperature of three-way catalyst 120. For example, throttle opening degree request unit 8102 may calculate the opening degree of throttle valve 112 corresponding to the temperature of three-way catalyst 120 based on the map shown in FIG. 4, and add the correction amount based on the engine speed to the calculated opening degree, thereby calculating the opening degree of throttle valve 112. For example, the correction amount in the case where engine speed NE is the first engine speed may be set to be greater than the correction amount in the case where engine speed NE is equal to the second engine speed greater than the first engine speed.

Furthermore, even in the case where fuel-cut request unit 8106 requests execution of fuel-cut control, when throttle opening degree request unit 8102 receives, from a catalyst deterioration detection unit 8212 described later, the information indicating that three-way catalyst 120 is deteriorated, throttle opening degree request unit 8102 transmits the opening degree allowing suppression of deterioration of three-way catalyst 120 as a requested amount to engine control unit 8200.

For example, when receiving the information from catalyst deterioration detection unit 8212 indicating that three-way catalyst 120 is deteriorated, throttle opening degree request unit 8102 may gradually decrease the opening degree of throttle valve 112 after every lapse of a predetermined time period until it stops receiving the information from catalyst deterioration detection unit 8212 indicating that three-way catalyst 120 is deteriorated, or may immediately decrease the opening degree at which deterioration is reliably suppressed (for example, the opening degree at which the throttle valve is fully closed).

Based on the shift condition of automatic transmission 2000, ignition timing request unit 8104 calculates the requested ignition timing in which case this request is issued by automatic transmission 2000 to engine 1000. Ignition timing request unit 8104 then transmits the calculated requested ignition timing to engine control unit 8200.

Fuel-cut request unit 8106 issues a request for fuel-cut to engine 1000 in accordance with the shift condition of automatic transmission 2000. For example, when the execution condition for fuel-cut control is satisfied that there is a request from the control system of automatic transmission 2000, fuel-cut request unit 8106 issues a request for fuel cut to engine control unit 8200.

Furthermore, when the execution condition for fuel-cut control is not satisfied, fuel-cut request unit 8106 stops issuing a request for fuel cut to engine 1000. For example, fuel-cut request unit 8106 stop issuing a request for fuel cut to engine 1000 when issuance of the request for torque down aiming at protecting the drive components is stopped or when upshift is completed.

Engine control unit 8200 includes a throttle opening degree control unit 8202, an ignition timing control unit 8204, a fuel-cut control execution determination unit 8206, a fuel injection control unit 8208, a catalyst temperature acquisition unit 8210, and a catalyst deterioration detection unit 8212.

Throttle opening degree control unit 8202 selects one of the requested amount of the opening degree of throttle valve 112 that is received from automatic transmission control unit 8100 and a plurality of requested amounts of the opening degree of throttle valve 112 that are received from another control system. Then, throttle opening degree control unit 8202 controls the electronic throttle such that the opening degree of throttle valve 112 achieves the selected requested amount of the opening degree of throttle valve 112.

For example, throttle opening degree control unit 8202 may select the minimum value from the plurality of requested amounts of the opening degree of throttle valve 112, may select the requested amounts of the opening degree of throttle valve 112 in the predetermined order of priority, or may select the opening amounts of throttle valve 112 in order of priority based on the vehicle state.

Throttle opening degree control unit 8202 generates a throttle opening control signal corresponding to the selected opening degree of throttle valve 112 and transmits the generated throttle opening control signal to the electronic throttle.

Ignition timing control unit 8204 selects one of the requested ignition timing received from automatic transmission control unit 8100 and a plurality of requested ignition timings received from another control system, and controls the ignition timing at which the spark plug of engine 1000 ignites such that the ignition timing of engine 1000 reaches the selected requested ignition timing.

For example, ignition timing control unit 8204 may select the value closest to the retard angle from the plurality of requested ignition timings, may select the ignition timings in the predetermined order of priority, or may select the ignition timings in the order of priority based on the vehicle state.

Ignition timing control unit 8204 generates the ignition timing control signal corresponding to the selected ignition timing, and transmits the generated ignition timing control signal to engine 1000.

Another control system may include, for example, a cruise control system for determining the opening degree or the ignition timing of throttle valve 112 for maintaining the vehicle velocity that is set by the driver, a VSC (Vehicle Stability Control) system for determining the opening degree or the ignition timing of throttle valve 112 for controlling the behavior of the vehicle, and the like.

Another control system may be executed by ECU 8000 or by another ECU. Another control system automatically determines the opening degree or the ignition timing of throttle valve 112 in accordance with the predetermined map and the like.

Fuel-cut control execution determination unit 8206 determines whether or not automatic transmission control unit 8100 requests fuel-cut control. When receiving a request for fuel-cut control from automatic transmission control unit 8100, fuel-cut control execution determination unit 8206 determines that fuel-cut control is requested.

Furthermore, when fuel-cut request unit 8106 stops issuing the request for fuel-cut control, fuel-cut control execution determination unit 8206 determines that fuel-cut control is not requested.

In addition, for example, when determining that fuel-cut control is requested, fuel-cut control execution determination unit 8206 may turn on an execution determination flag. Furthermore, for example, when determining that fuel-cut control is not requested, fuel-cut control execution determination unit 8206 may turn off the execution determination flag.

Furthermore, in the case where engine speed NE is equal to or greater than the predetermined engine speed in addition to the case where automatic transmission control unit 8100 requests fuel-cut control, fuel-cut control execution determination unit 8206 may turn on the execution determination flag.

When fuel-cut control execution determination unit 8206 determines that fuel-cut control is requested, fuel injection control unit 8208 executes fuel-cut control.

Fuel injection control unit 8208 generates a fuel injection control signal so as to stop the fuel supply by fuel supply device 126, and transmits the generated fuel injection signal to fuel supply device 126. In addition, fuel injection control unit 8208 may execute fuel-cut control, for example, when the execution determination flag is turned on.

When fuel-cut request unit 8106 stops issuing the request for fuel-cut control, fuel injection control unit 8208 executes return control from fuel-cut control. In this case, fuel injection control unit 8208 controls engine 1000 to achieve the intake air amount, ignition timing and fuel injection amount in accordance with the vehicle running state (the vehicle velocity, the accelerator pedal position, and the like). In addition, fuel injection control unit 8208 may execute return control from fuel-cut control when the execution determination flag is turned OFF from ON.

Catalyst temperature acquisition unit 8210 acquires the temperature of three-way catalyst 120. In the present embodiment, catalyst temperature acquisition unit 8210 estimates the temperature of three-way catalyst 120 based on the operation state of engine 1000. It is to be noted that catalyst temperature acquisition unit 8210 may acquire the temperature of three-way catalyst 120 directly from the output results of the temperature sensor and the like provided in three-way catalyst 120.

Figure 5:
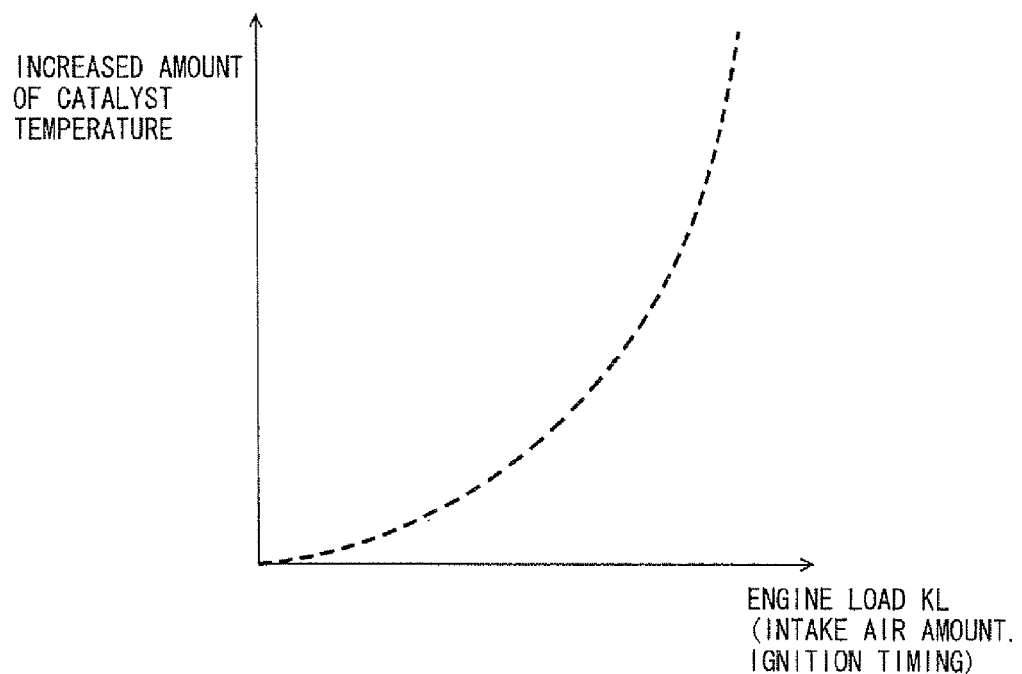
FIG. 5 is a diagram showing the relationship between the variation of the catalyst temperature and the load of the engine.

Catalyst temperature acquisition unit 8210 refers to the intake-air temperature or the outside air temperature as an initial value at the time of start-up of engine 1000 to calculate the increased amount of the temperature of three-way catalyst 120 based on the load of engine 1000 and the map (for example, the map shown in FIG. 5), and then, adds the resultant to the temperature of three-way catalyst 120 previously calculated. Similarly, catalyst temperature acquisition unit 8210 calculates the decreased amount of the temperature based on the load of engine 1000 and the map (not shown), and then, subtracts the resultant from the temperature of three-way catalyst 120 previously calculated. The vertical axis in the map shown in FIG. 5 shows the increased amount of the temperature of three-way catalyst 120 while the horizontal axis shows the load of engine 1000 (for example, the load calculated based on the intake air amount and the ignition timing). As shown in FIG. 5, the increased amount of the temperature of three-way catalyst 120 is increased in accordance with an increase in the load to engine 1000.

Catalyst temperature acquisition unit 8210 transmits the acquired temperature of three-way catalyst 120 to throttle opening degree request unit 8102.

Catalyst deterioration detection unit 8212 detects the deterioration state of three-way catalyst 120. In the present embodiment, catalyst deterioration detection unit 8212 detects the deterioration state of three-way catalyst 120, for example, based on the oxygen storage capacity of three-way catalyst 120. The manner of change in the oxygen concentration between the upstream and the downstream of three-way catalyst 120 is different between the case where the oxygen storage capacity of three-way catalyst 120 is high and the case where the oxygen storage capacity of three-way catalyst 120 is low. Accordingly, catalyst deterioration detection unit 8212 can quantify the oxygen storage capacity of three-way catalyst 120 based on the detection results of air-fuel ratio sensor 200 and oxygen sensor 102, and, based on the quantified oxygen storage capacity, detect the deterioration state of three-way catalyst 120.

In the case where the oxygen storage capacity of three-way catalyst 120 quantified based on the detection results of air-fuel ratio sensor 200 and oxygen sensor 102 is lower than the predetermined degree of the capacity, catalyst deterioration detection unit 8212 detects the deterioration state of three-way catalyst 120. In contrast, in the case where the oxygen storage capacity of three-way catalyst 120 quantified based on the detection results of air-fuel ratio sensor 200 and oxygen sensor 102 is equal to or greater than the predetermined degree of the capacity, catalyst deterioration detection unit 8212 detects that three-way catalyst 120 is not deteriorated. In addition, the well-known technique may be used to determine whether three-way catalyst 120 is deteriorated or not, but the technique is not limited to that based on the oxygen storage capacity as described above.

In the present embodiment, automatic transmission control unit 8100 including throttle opening degree request unit 8102, ignition timing request unit 8104 and fuel-cut request unit 8106, and engine control unit 8200 including throttle opening degree control unit 8202, ignition timing control unit 8204, fuel-cut control execution determination unit 8206, fuel injection control unit 8208, catalyst temperature acquisition unit 8210, and catalyst deterioration detection unit 8212 each are described as functioning as software implemented by the CPU of ECU 8000 executing the program stored in the memory, but the entire configuration or a part of the configuration may be implemented by hardware. It is to be noted that such a program is recorded on a storage medium which is mounted in the vehicle.

Figure 6:
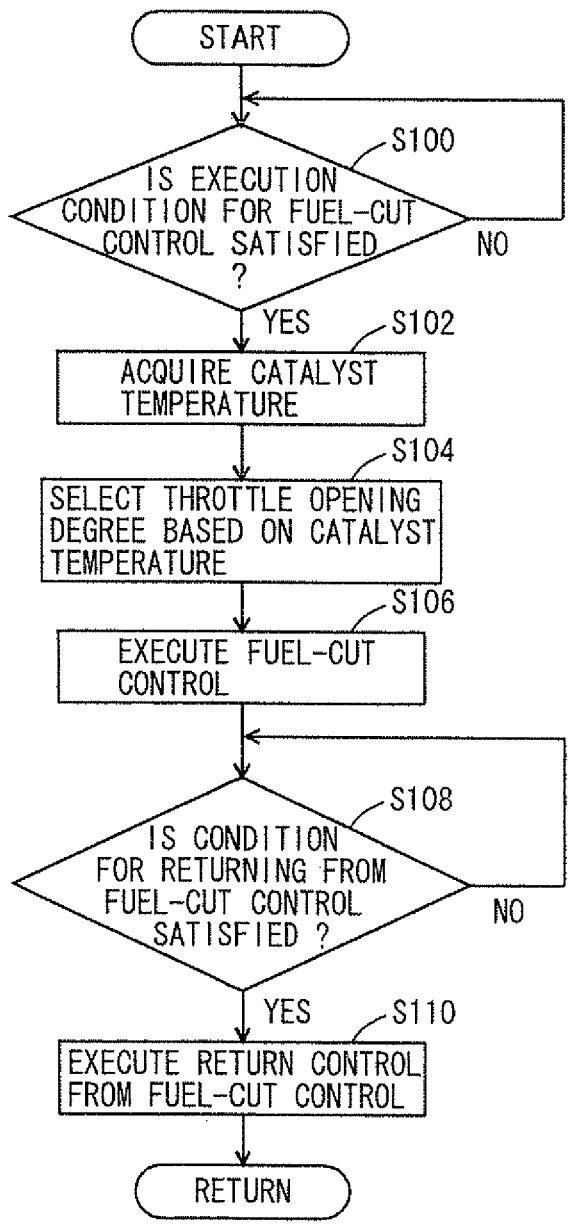
FIG. 6 is a flow chart showing the control structure of the program executed by the ECU which is a control device for the vehicle according to the present embodiment.

Referring to FIG. 6, the control structure of the program executed by ECU 8000 that is a control device for the vehicle according to the present embodiment will be hereinafter described.

In step (which will be hereinafter abbreviated as S) 100, ECU 8000 determines whether the execution condition for fuel-cut control is satisfied or not. If the execution condition for fuel-cut control is satisfied (YES in S100), the process proceeds to S102. If not (NO in S100), the process is returned to S100.

In S102, ECU 8000 acquires the temperature of three-way catalyst 120. In S104, ECU 8000 selects the opening degree of throttle valve 112 based on the acquired temperature of three-way catalyst 120. In S106, ECU 8000 executes fuel-cut control.

In S108, ECU 8000 determines whether the condition for returning from fuel-cut control is satisfied or not. If the condition for returning from fuel-cut control is satisfied (YES in S108), the process proceeds to S110. If not (NO in S108), the process is returned to S108. In S110, ECU 8000 executes the return control from fuel-cut control.

The operation of ECU 8000 that is a control device for the vehicle according to the present embodiment based on the above-described structure and flow chart will be hereinafter described with reference to FIG. 7.

For example, assume that the vehicle is accelerated in the state where the driver presses accelerator pedal 8008 by a certain amount.

Turbine rotation speed NT and engine speed NE are increased in accordance with an increase in the speed of the vehicle. In this case, since the execution condition for fuel-cut control is not satisfied (NO in S100), the execution determination flag remains turned OFF.

Since accelerator pedal 8008 is pressed by a certain amount, the opening degree of throttle valve 112 and the actual output torque of the engine also remain constant.

At a time T(0), when the position on the shift diagram based on the vehicle running state (for example, the accelerator pedal position and the vehicle velocity) crosses the upshift line, the upshift of automatic transmission 2000 is started. In this case, since automatic transmission control unit 8100 issues a request for fuel-cut control to engine control unit 8200, the execution condition for fuel-cut control is satisfied (YES in S100). Thus, the temperature of three-way catalyst 120 is acquired (S102), and the opening degree of throttle valve 112 is selected based on the acquired temperature of three-way catalyst 120 (S104). In this case, throttle valve 112 is not closed such that the opening degree of throttle valve 112 reaches 0% of the opening degree at which throttle valve 112 is fully closed, as shown by dashed lines in FIG. 7.

When fuel-cut control is executed during gear shifting (S106), turbine rotation speed NT and engine speed NE are rapidly decreased, which allows shortening of the time required for shifting gear.

At a time T(1), when upshift of automatic transmission 2000 is completed, automatic transmission control unit 8100 stops issuing a request for fuel-cut control to engine control unit 8200, which allows the return condition to be satisfied (YES in S108). Consequently, the return control from fuel-cut control is executed (S110).

Figure 7:
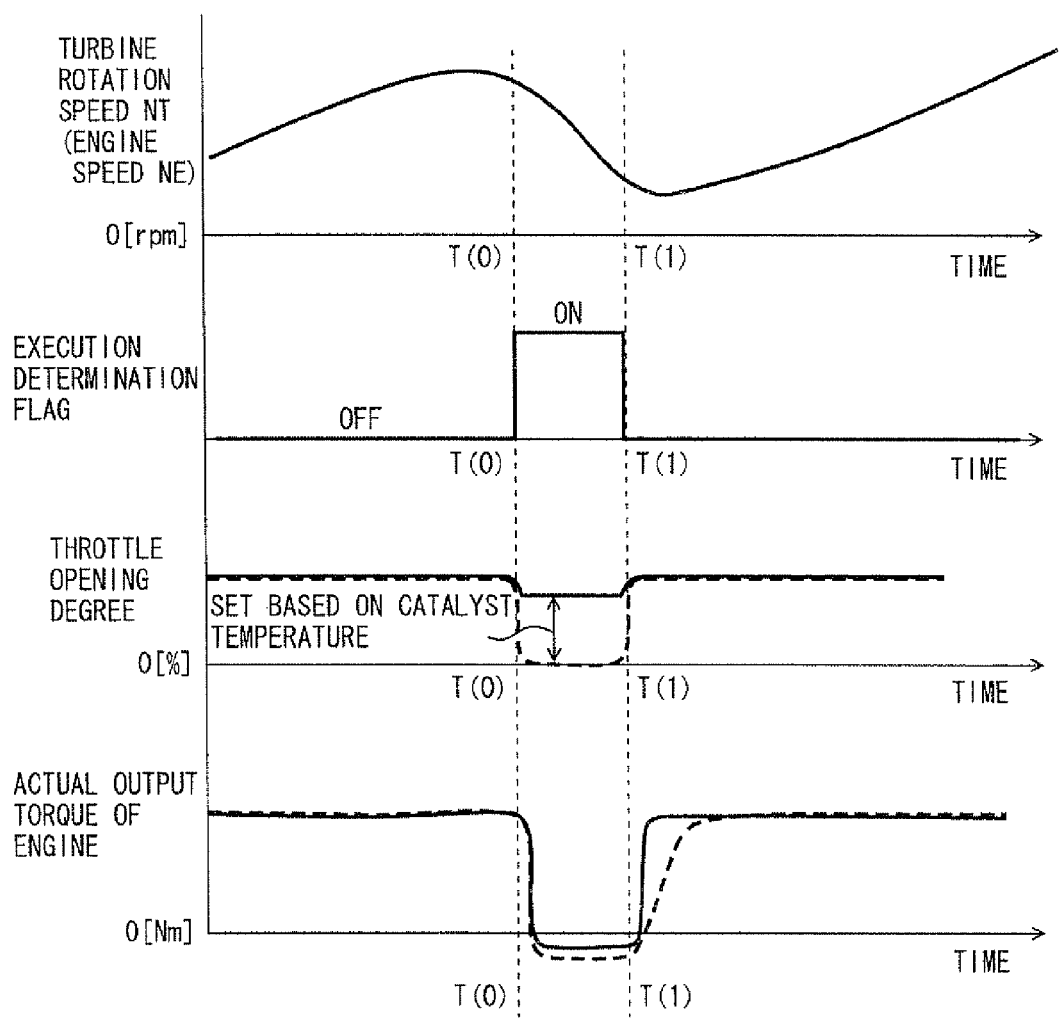
FIG. 7 is a timing chart showing the operation of the ECU which is a control device for the vehicle according to the present embodiment.

In this case, the actual output torque of the engine after return (the solid line in FIG. 7) is increased more rapidly than the case of the actual output torque (the dashed line in FIG. 7) at the time when throttle valve 112 is closed to reach the opening degree at which the throttle valve is fully closed, as shown by the dashed line in FIG. 7. Accordingly, the responsiveness of the actual output torque at the time of return is improved.

In addition, in the case where the deterioration state of three-way catalyst 120 is detected during execution of fuel-cut control, the opening degree at which deterioration of three-way catalyst 120 is suppressed is assumed to be a requested amount.

As described above, according to the control device for a vehicle in accordance with the present embodiment, when the opening degree of the throttle valve is controlled to achieve the flow rate corresponding to the acquired temperature of the three-way catalyst, fuel-cut control can be executed without having to close the throttle valve to the opening degree at which the throttle valve is fully closed. Accordingly, when the condition for returning from fuel-cut control is satisfied, the throttle valve can be immediately opened to the normal opening degree of the throttle valve, so that the delay in the output power increase in the engine can be mitigated. Consequently, the deterioration of the three-way catalyst can be suppressed while the responsiveness at the time of return can also be improved. Therefore, a control device and a control method for a vehicle can be provided which allow an increase in the output power of the engine with excellent responsiveness at the time of return from fuel-cut control.

Furthermore, in the case where the deterioration state of the three-way catalyst cannot allow execution of control of the opening degree of the throttle valve corresponding to the temperature of the three-way catalyst, the opening degree of the throttle valve is controlled to be equal to the opening degree at which deterioration of the three-way catalyst is suppressed. Consequently, in accordance with the state of the three-way catalyst, deterioration of the three-way catalyst can be suppressed while the responsiveness at the time of return can be improved.

In addition, although an explanation has been made in the present embodiment with regard to the configuration in which the temperature of the three-way catalyst acquired in engine control unit 8200 is transmitted to automatic transmission control unit 8100, and, in this automatic transmission control unit 8100, the opening degree of the throttle valve corresponding to the temperature of the three-way catalyst is calculated, the configuration is not particularly limited thereto.

Figure 8:
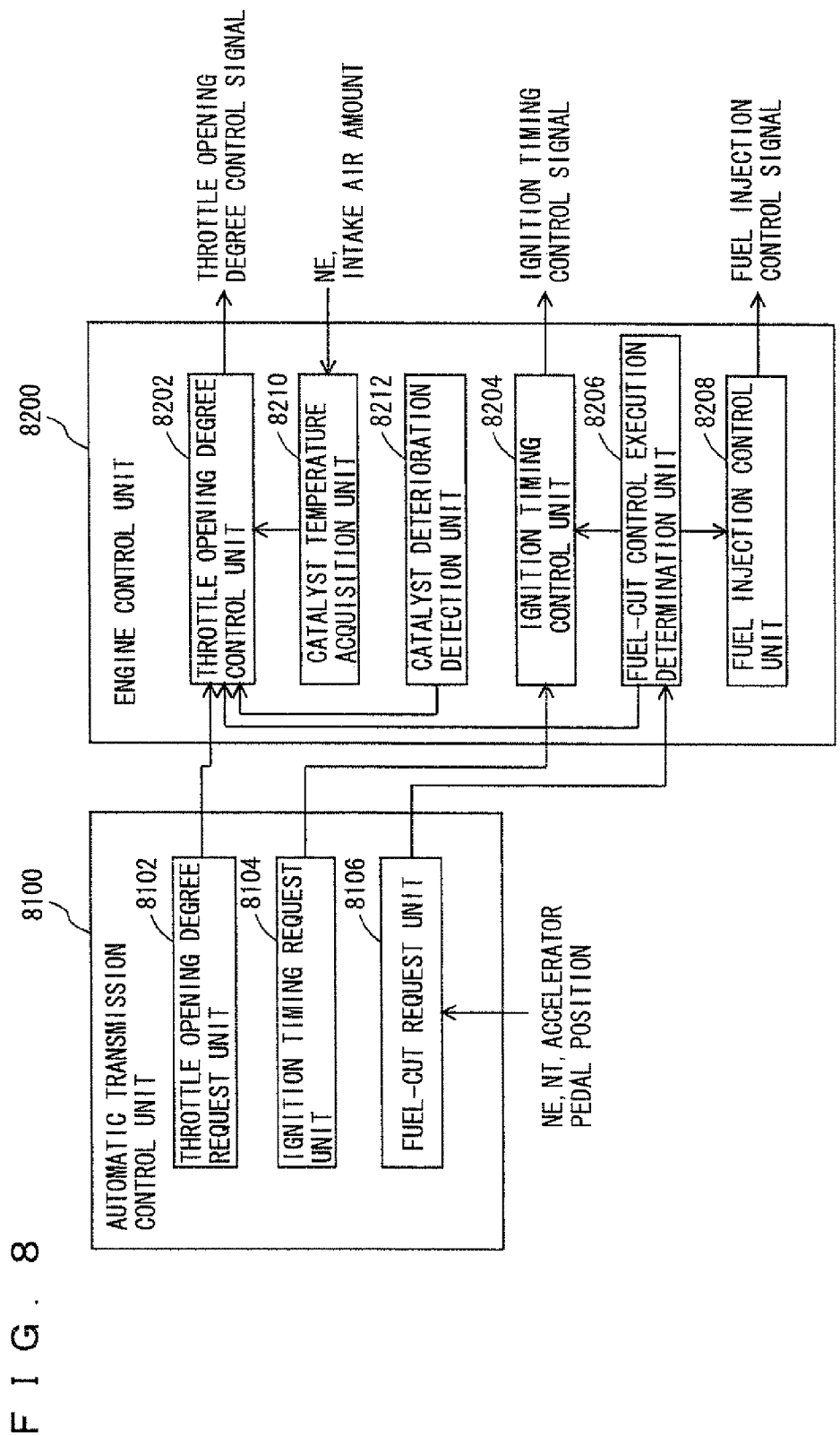
FIG. 8 is a functional block diagram (second) of the ECU which is a control device for the vehicle according to the present embodiment.

For example, as shown in FIG. 8, the temperature of three-way catalyst 120 acquired in catalyst temperature acquisition unit 8210 may be transmitted to throttle opening degree control unit 8202, the requested amount of the opening degree of throttle valve 112 corresponding to the temperature of the three-way catalyst may be calculated in this throttle opening degree control unit 8202 having received the temperature of three-way catalyst 120, and one of a plurality of requested amounts of the opening degree of throttle valve 112 including the requested amount of the opening degree of throttle valve 1120 received from automatic transmission control unit 8100 may be selected. In the case where the fuel-cut control execution determination unit determines that there is a request for fuel-cut control, throttle opening degree control unit 8202 selects the requested amount of the opening degree of throttle valve 112 corresponding to the temperature of three-way catalyst 120.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 102 oxygen sensor, 104 intake air temperature sensor, 106 water temperature sensor, 108 exhaust pipe, 110 intake pipe, 112 throttle valve, 114 throttle motor, 118 air cleaner, 120, 166 three-way catalyst, 126 fuel supply device, 152 intake system, 154 exhaust system, 158 intake port, 160 exhaust port, 162 cylinder, 164 exhaust pipe, 172 intake valve, 174 exhaust valve, 176 spark plug, 190 air flow meter, 200 air-fuel ratio sensor, 1000 engine, 2000 automatic transmission, 3000 planetary gear unit, 3200 torque converter, 4000 hydraulic circuit, 5000 differential gear, 6000 drive shaft, 7000 wheel, 8002 wheel speed sensor, 8004 shift lever, 8006 position switch, 8008 accelerator pedal, 8010 accelerator pedal position sensor, 8016 electronic throttle, 8018 throttle position sensor, 8020 engine speed sensor, 8022 input shaft rotation speed sensor, 8024 output shaft rotation speed sensor, 8100 automatic transmission control unit, 8102 throttle opening degree request unit, 8104 ignition timing request unit, 8106 fuel-cut request unit, 8200 engine control unit, 8202 throttle opening degree control unit, 8204 ignition timing control unit, 8206 fuel-cut control execution determination unit, 8208 fuel injection control unit, 8210 catalyst temperature acquisition unit, 8212 catalyst deterioration detection unit

The invention claimed is:

1. A control device for a vehicle equipped with an internal combustion engine, said internal combustion engine including a cylinder, an intake path for introducing air into said cylinder, a throttle valve for regulating a flow rate of the air introduced through said intake path into said cylinder, a fuel supply device for supplying a fuel to said internal combustion engine, an exhaust path for circulating exhaust gas discharged from said cylinder and a catalyst provided in a middle of said exhaust path and purifying said exhaust gas, said control device comprising:

an acquisition unit acquiring a temperature of said catalyst by performing one of detection and estimation of the temperature of said catalyst;

an engine speed detection unit detecting an engine speed of said internal combustion engine;

a determination unit determining whether a predetermined condition for starting fuel-cut control to stop supply of said fuel by said fuel supply device is satisfied or not;

a fuel-cut control unit executing said fuel-cut control when said predetermined condition is satisfied;

an opening degree control unit controlling an opening degree of said throttle valve during execution of said fuel-cut control by said fuel-cut control unit such that the flow rate of the air supplied from said intake path to said cylinder is equal to a first flow rate calculated based on the temperature of said catalyst acquired by said acquisition unit; and a calculation unit calculating an opening degree of said throttle valve based on the temperature of said catalyst acquired by said acquisition unit and the engine speed of said internal combustion engine, wherein said calculation unit calculates a first opening degree of said throttle valve corresponding to the temperature of said catalyst such that the opening degree of said throttle valve calculated when the temperature of said catalyst acquired by said acquisition unit is a first temperature is greater than the opening degree of said throttle valve calculated when the temperature of said catalyst is a second temperature higher than said first temperature, and calculates a second opening degree of said throttle valve by adding, to said first opening degree, a correction amount corresponding to the engine speed of said internal combustion engine calculated such that the correction amount in a case where the engine speed of said internal combustion engine is a first engine speed is greater than the correction amount in a case where the engine speed of said internal combustion engine is equal to a second engine speed greater than the first engine speed, and said opening degree control unit controlling the opening degree of said throttle valve so as to be equal to the second opening degree calculated by said calculation unit during execution of said fuel-cut control by said fuel-cut control unit.

2. The control device for a vehicle according to claim 1, further comprising a deterioration detection unit detecting a deterioration state of said catalyst, wherein said opening degree control unit controls the opening degree of said throttle valve during execution of said fuel-cut control by said fuel-cut control unit such that the opening degree of said throttle valve is equal to the opening degree at which deterioration of said catalyst is suppressed when the deterioration state of said catalyst detected by said deterioration detection unit does not allow execution of control of the opening degree of said throttle valve corresponding to the temperature of said catalyst.

3. The control device for a vehicle according to claim 1, wherein said vehicle is provided with an automatic transmission coupled to an output shaft of said internal combustion engine and transmitting motive power to a driving wheel, a plurality of drive components are provided on a power transmission path between said internal combustion engine and said driving wheel, and said predetermined condition corresponds to at least one of a condition that said automatic transmission issues a request for torque down aiming at protecting said drive components to said internal combustion engine and a condition that upshift of said automatic transmission is started.

4. A control method for a vehicle equipped with an internal combustion engine, said internal combustion engine including a cylinder, an intake path for introducing air into said cylinder, a throttle valve for regulating a flow rate of the air introduced through said intake path into said cylinder, a fuel supply device for supplying a fuel to said internal combustion engine, an exhaust path for circulating exhaust gas discharged from said cylinder, and a catalyst provided in a middle of said exhaust path and purifying said exhaust gas, said control method comprising the steps of:

acquiring a temperature of said catalyst by performing one of detection and estimation of the temperature of said catalyst;

determining whether a predetermined condition for starting fuel-cut control to stop supply of said fuel by said fuel supply device is satisfied or not;

executing said fuel-cut control when said predetermined condition is satisfied; and controlling an opening degree of said throttle valve during execution of said fuel-cut control such that the flow rate of the air supplied from said intake path to said cylinder is equal to a first flow rate calculated based on the temperature of said catalyst acquired in said step of acquiring the temperature of said catalyst; and calculating an opening degree of said throttle valve based on the temperature of said catalyst acquired in said step of acquiring the temperature of said catalyst, wherein said step of calculating the opening degree of said throttle valve calculates a first opening degree of said throttle valve corresponding to the temperature of said catalyst such that the opening degree of said throttle valve calculated when the temperature of said catalyst acquired in said step of acquiring the temperature of said catalyst is a first temperature is greater than the opening degree of said throttle valve calculated when the temperature of said catalyst is a second temperature higher than said first temperature, and calculates a second opening degree of said throttle valve by adding, to said first opening degree, a correction amount corresponding to an engine speed of said internal combustion engine calculated such that the correction amount in a case where the engine speed of said internal combustion engine is a first engine speed is greater than the correction amount in a case where the engine speed of said internal combustion engine is equal to a second engine speed greater than the first engine speed, and said step of controlling the opening degree of said throttle valve controls the opening degree of said throttle valve so as to be equal to said second opening degree calculated in said step of calculating the opening degree of said throttle valve during execution of said fuel-cut control.

5. The control method for a vehicle according to claim 4, further comprising the step of detecting a deterioration state of said catalyst, wherein said step of controlling the opening degree of said throttle valve controls the opening degree of said throttle valve during execution of said fuel-cut control such that the opening degree of said throttle valve is equal to the opening degree at which deterioration of said catalyst is suppressed when the deterioration state of said catalyst detected in said step of detecting the deterioration state of said catalyst does not allow execution of control of the opening degree of said throttle valve corresponding to the temperature of said catalyst.

6. The control method for a vehicle according to claim 4, wherein said vehicle is provided with an automatic transmission coupled to an output shaft of said internal combustion engine and transmitting motive power to a driving wheel, a plurality of drive components, are provided on a power transmission path between said internal combustion engine and said driving wheel, and said predetermined condition corresponds to at least one of a condition that said automatic transmission issues a request for torque down aiming at protecting said drive components to said internal combustion engine and a condition that upshift of said automatic transmission is started.

7. The control device for a vehicle according to claim 2, wherein said vehicle is provided with an automatic transmission coupled to an output shaft of said internal combustion engine and transmitting motive power to a driving wheel, a plurality of drive components are provided on a power transmission path between said internal combustion engine and said driving wheel, and said predetermined condition corresponds to at least one of a condition that said automatic transmission issues a request for torque down aiming at protecting said drive components to said internal combustion engine and a condition that upshift of said automatic transmission is started.

8. The control method for a vehicle according to claim 5, wherein said vehicle is provided with an automatic transmission coupled to an output shaft of said internal combustion engine and transmitting motive power to a driving wheel, a plurality of drive components, are provided on a power transmission path between said internal combustion engine and said driving wheel, and said predetermined condition corresponds to at least one of a condition that said automatic transmission issues a request for torque down aiming at protecting said drive components to said internal combustion engine and a condition that upshift of said automatic transmission is started.

* * * * *